United States Patent
Eker et al.

(10) Patent No.: US 7,917,913 B2
(45) Date of Patent: Mar. 29, 2011

(54) INJECTING PROXY COMPONENTS USING BLUEPRINTS

(75) Inventors: Johan Eker, Lund (SE); Jan Patrik Persson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1100 days.

(21) Appl. No.: 11/615,122

(22) Filed: Dec. 22, 2006

(65) Prior Publication Data

US 2008/0072244 A1    Mar. 20, 2008

Related U.S. Application Data

(60) Provisional application No. 60/825,807, filed on Sep. 15, 2006.

(51) Int. Cl.
*G06F 9/44* (2006.01)
*G06F 9/46* (2006.01)

(52) U.S. Cl. .................... 719/315; 719/316; 719/330

(58) Field of Classification Search .................. None
See application file for complete search history.

(56) References Cited

U.S. PATENT DOCUMENTS

| | | | |
|---|---|---|---|
| 6,157,961 A | 12/2000 | Kessler et al. | |
| 6,487,607 B1 | 11/2002 | Wollrath et al. | |
| 6,993,774 B1 | 1/2006 | Glass | |
| 2001/0037417 A1 | 11/2001 | Meyer | |
| 2002/0059212 A1* | 5/2002 | Takagi | 707/3 |
| 2002/0199036 A1* | 12/2002 | Arnold et al. | 719/330 |
| 2003/0181193 A1 | 9/2003 | Wilhelmsson et al. | |
| 2004/0221017 A1 | 11/2004 | Yoon | |
| 2005/0268309 A1 | 12/2005 | Krishnaswamy et al. | |
| 2007/0094364 A1* | 4/2007 | Oberhauser | 709/223 |

FOREIGN PATENT DOCUMENTS

| | | |
|---|---|---|
| DE | 10107434 | 9/2002 |
| EP | 1 122 644 A1 | 8/2001 |
| EP | 1 420 340 A1 | 5/2004 |

OTHER PUBLICATIONS

The Component Object Model: A Technical Overview. Microsoft Developer Network. /msdn.microsoft.com/library/default.asp?URL=/library/techart/msdn_comppr.htm copyright 2007, 13 pages.

Wollrath, A. et al.: "A Distributed Object Model for the Java(TM) System" Conference on Object-Oriented Technologies, XX, XX, Jun. 17, 1996, pp. 219-231, XP000997457.

Seitz, J. et al., "Management of Proxy Objects Providing Multimedia Applications in the Mobile Environment" Proceedings of IM'99 Sixth IFIP/IEEE International Symposium on Integrated Network Management. Boston Park Plaza Hotel, Boston MA, USA, May 24-28, 1999, pp. 915-928.

(Continued)

*Primary Examiner* — Li B Zhen

(74) *Attorney, Agent, or Firm* — Potomac Patent Group PLLC

(57) ABSTRACT

A software component deployed in a distributed system includes a stub that enables the component to be used remotely. The stub can include its own proxy (or at least a sufficient description of it) that is automatically and dynamically injected to the remote environment. Thus, native proxies do not need to be included in the platform initially, and do not need to be downloaded, since marshalling methods are generated at runtime based on a blueprint in the code of the application.

24 Claims, 5 Drawing Sheets

OTHER PUBLICATIONS

Lee, C. et al., "Konark: A System and Protocols for Device Independent, Peer-to-Peer Discovery and Delivery of Mobile Services", the IEEE Transaction on Systems, Man and Cybernatics, vol. 33, No. 6, Nov. 2003, pp. 682-696.

Corsaro, A. et al., "A C++ native interface for interpreted JVMs" On the move to Meaningful Internet Systems 2003: OTM 2003 Workshops. OTM Confederated International Workshops HCI-SWWA, IPW, JTRES, WORM, WMS and WRSM 2003. Proceedings. (Lecture Notes in Comput. Sci. vol. 2889) Springer-Verlag Berlin, Germany, Nov. 3, 2003, pp. 564-577, XP002428439. ISBN: 3-540-20494-6.

Li, J. et al., "Enabling rapid feature deployment on embedded platforms with JeCOM bridge" On the move to Meaningful Internet Systems 2004: COOPIS, DOA, and ODBASE. OTM Confederated International Conferences COOPIS, DOA, and ODBASE 2004. Proceedings, Park II (Lecture notes in Computer Science vol. 3291) Springer-Verlag Berlin, Germany, Oct. 25, 2004, pp. 1482-1501, XP002428438, ISBN: 3-540-23662-7.

Anonymous: "J-Integra for COM Documentation—Version 2.3—Introduction" J-Integra Documentation, [Online] Aug. 2, 2005, p. 1-2, XP002428440. Retrieved from the Internet: //web.archive.org/web/20050802093713/http://j-integra.intrinsyc.com/support/com/doc/intro.html>.

Anonymous: "Accessing Java objects from COM" J-Integra for COM Documentation, [Online] Dec. 20, 2005, pp. 1-10, XP002428441. Retrieved from the Internet: ://web.archive.org/web/20051220231202/http://j-integra.intrinsyc.com/support/com/doc/javafromcom/index.html>.

Van Heiningen, W. et al., "Exploiting Dynamic Proxies in Middleware for Distributed, Parallel and Mobile Java Applications", in Proceedings of the 8th International Workshop on Java for Parallel and Distributed Computing (JAVAPDC 2006) Rhodes Island, Greece, Apr. 2006.

* cited by examiner

IDL file

Generated Java class

INJECTING PROXY COMPONENTS USING BLUEPRINTS

This application claims the benefit of the filing date of U.S. Provisional Patent Application No. 60/825,807 filed on Sep. 15, 2006, the content of which is incorporated here by reference.

BACKGROUND

This invention concerns software components and more particularly stubs that contain, or describe, their own proxies and inject such proxies into target environments.

In general, a "software component" is a computer program object or a collection of objects that conforms to a specification, such as the component object model (COM), the distributed component object model (DCOM), the Ericsson component model (ECM) Java, etc. The COM, for example, is described at Microsoft's website. In general, a software component exists within a context, i.e., a component environment according to a model, such as COM, ECM, etc.

Software component interfaces can be described in binary or textual forms according to suitable interface description languages (IDLs), and thus a software component can exist in a processor as an entity that is separate from other software components in the processor. A software component provides one or more interfaces, and uses other software components only via their respective interfaces. In particular, this means that two software components implementing the same interface are interchangeable in many situations.

The advantages of using software components include modularity, support for distributed processing systems, and language independence, which means that software components implemented in different computer programming languages can work together.

It is often the case that software components need to interact over network, language, or other boundaries. When a software component is to be accessed or shared across execution contexts or network links, a process of serialization, or marshalling, is used for encoding method invocations (including parameter values), allowing invocations to be forwarded across boundaries.

It is common to use "proxies" and "stubs" (which are further described below) for interactions of software components across boundaries. A proxy-stub pair enables two software components to communicate (i.e., interact) as if they were located within the same processor address space, thus making the software components independent of the particular communication details. The role of the proxy is to receive method invocations on behalf of a "remote" interface, and pass these method invocations on to a remote stub. The term "remote" here means "located in a separate address space". The role of the stub is to receive method invocations, and to pass them on to a "local" interface. The term "local" here means "located in the same address space".

Thus, a proxy, in a very general form, is an object functioning as an interface to something else, and that something else can be anything: a network connection, an object in memory, a file, or another resource that may be expensive or difficult to duplicate. In software development, a stub is a piece of programming code that is used to stand in for some other programming functionality. For example, a stub may simulate the behavior of existing code (such as a procedure on a remote machine) or be a temporary substitute for yet-to-be-developed code. Stubs are therefore useful in distributed computing in addition to software development and testing.

FIG. 1 depicts a generalized distributed system having two address spaces separated by an address space boundary. Two software components A and B can interact across the boundary through a proxy-stub pair IX_proxy and IX_stub. The IX_proxy is typically created by the system or environment on demand, and implements an Interface IX that is the same or at least substantially the same as an Interface IX of component B. Software components reference each other by using interface references, and such uses are independent of which component implements the referenced interface. Hence, software component A does not need to know it is using a proxy: methods in Interface IX can be invoked just as if the Interface IX of software component B were used directly.

As noted above, software component A invokes a method in Interface IX of software component B by the process of marshalling, which involves messages that include all method parameters, as follows:

component A invokes the method using an IX reference, which refers to an IX_proxy (indicated in FIG. 1 by the arrow 1);

the IX_proxy sends to the IX_stub a message, which contains all necessary information about the method invocation, such as the interface identity, method identity, and parameters (indicated in FIG. 1 by the arrow 2); and the IX_stub receives the message and performs the actual method invocation in Interface IX in the component B (indicated in FIG. 1 by the arrow 3).

The return value, and possibly output parameters, of component B, if any, are sent back via the proxy to software component A by a similar method (not shown in FIG. 1).

This sort of situation applies in a distributed processing system, in which software components are located in different processing systems that are parts of the distributed system, and it also frequently applies to software components implemented in different languages. For example, a software component implemented in the Java programming language typically cannot share memory with one implemented in the C programming language. Such components are considered as residing in separate address spaces. In this application, the terms "distributed system" or "distributed systems" and "distributed component" or "distributed components" cover both of those situations.

Java Connected Limited Device Configuration (CLDC) is a platform or environment that is often used in devices having limited processing resources, such as mobile telephones and terminals, and Java CLDC and other platforms do not allow "native" computer code to be downloaded or installed into terminals after production. Native code, or native language, is simply machine code developed to run on a specific processor. It is generally not desirable to install such code in mobile terminals after production, since native code needs to be developed for the particular processor at hand, is complex to install, and gains unlimited control of the system (thus breaching the strict security requirements of a mobile terminal device). Thus, such platforms preclude the use of "callbacks" (i.e., calls from a platform to an application) unless proxies for all possible callbacks are installed permanently in a terminal during production. Such callback-proxy installation is unrealistic due to constraints on the size of flash memory in many mobile terminals and similar devices.

European Patent Publication EP 1 122 644, which corresponds in part to U.S. Patent Application Publication U.S. 2001/0037417, for "A Method and System for Dynamically Dispatching Function Calls from a First Execution Environment to a Second Execution Environment" describes techniques for automatic marshalling (generated from IDL), but does not concern the particular challenges with callbacks, only forward calls, and hence does not concern injecting proxies from stubs.

U.S. Patent Application Publication No. U.S. 2002/0199036 describes methods of saving bandwidth in a distributed system by introducing active proxies, which contain logic and permit functionality to be executed locally, without accessing the remote objects. Such a proxy can implement some methods locally without contacting a represented object, and is based on Remote Method Invocation (RMI), which is a Java routine. RMI enables a Java program running on one computer to access objects and methods of another Java program running on a different computer, with a Java Virtual Machine handling the communication. Because Java is run on both sides, code can be dynamically downloaded on both sides, and thus proxy injections are not necessary and problems with safe dynamic loading of new clients that listen to callbacks from a native environment are not encountered.

U.S. Pat. No. 6,157,961 describes a distributed computing system having logic modules that include a client-side stub generator and a client-side stub interpreter for generating/decompressing/interpreting proxies at runtime in RMI/RPC contexts. "RPC" is Remote Procedure Call, which is a protocol that allows a program running on one host processor to cause code to be executed on another host processor. The proxy code is divided into two parts, one that is common to all proxy operations and the other that is unique. Thus, the memory space needed by the client-side stubs can be minimized. Like the previously cited publications, problems with safe dynamic loading of new clients that listen to callbacks from a native environment are not encountered.

These limitations on the use of callbacks in distributed systems that include mobile and other communication devices cause problems that so far have not been adequately solved.

SUMMARY

The invention concerns stubs that contain, or describe, their own proxies and inject such proxies into target environments, and is particularly useful in the context of downloadable/user-installable Java applications, as deployed in devices such as mobile telephones and mobile terminals.

In accordance with aspects of this invention, there is provided a method of operating software components in a processing system. The method includes the steps of configuring a Platform to include a Proxy Environment and a first software component, wherein the Proxy Environment enables proxies to be injected into the Platform, and the first software component needs to invoke at least one method in at least one second software component; downloading the at least one second software component into a remote address space separate from a local address space that includes the first software component and the Proxy Environment, wherein the second software component includes a stub for an interface and a proxy for the stub that enables the second software component to be used remotely by the first software component; transferring the proxy into the Proxy Environment; and establishing a connection between the first software component and the second software component via the proxy and stub. The connection enables the first software component to invoke at least one method in the second software component as if the second software component were local to the first software component.

In accordance with other aspects of this invention, there is provided a method of configuring a downloadable software component. The method includes the steps of including a stub for an interface in the software component; and including in the stub at least a description of a proxy for the stub. The proxy enables the software component to be used remotely.

In accordance with other aspects of this invention, there is provided a user equipment in a wireless communication system that includes at least one memory, and at least one programmable processor that processes information stored in the at least one memory. The stored information includes first and second software components, and the processor configures a Platform to include a Proxy Environment and the first software component. The Proxy Environment enables proxies to be injected into the Platform, and the first software component needs to invoke at least one method in the second software component. The second software component is downloaded into a remote address space in the at least one memory that is separate from a local address space in the at least one memory that includes the first software component and the Proxy Environment. The second software component includes a stub for an interface and a proxy for the stub that enables the second software component to be used remotely by the first software component. The proxy is transferred into the Proxy Environment, and a connection between the first software component and the second software component is established via the proxy and stub. The connection enables the first software component to invoke at least one method in the second software component as if the second software component were local to the first software component.

BRIEF DESCRIPTION OF THE DRAWINGS

The various features, advantages, and objects of this invention will be understood by reading this description in conjunction with the drawings, in which.

DETAILED DESCRIPTION

It will be understood that this invention can be considered as relating to part of a Java OPA (jOPA) architecture, which involves light-weight Java bindings to an Open Platform Application Programming Interface (OPA), which is described in U.S. patent application Publication No. 2003/0181193 to Wilhelmsson et al. for "Middleware Services Layer for Platform System for Mobile Terminals", for example. It will also be understood that the invention is not limited to the jOPA architecture.

The inventors have recognized that when a software component is deployed in a distributed system, a stub can be provided with the component that enables the component to be used remotely. The stub can include its own proxy (or at least a sufficient description of it) that is automatically dynamically injected (i.e., transferred) to the (remote) target environment. Thus, for a downloaded Java application for example, native proxies for each specific callback interface do not need to be included in the platform initially, and do not need to be downloaded, since marshalling methods are generated (or configured) at runtime based on a blueprint in the Java code of the application. It is currently believed that this arrangement is particularly useful in contexts like downloadable/user-installable code. In contrast with native code, compiled Java code is independent of the particular processor at hand, is straight-forward to load into a terminal after production, and has a strict security model protecting system integrity.

Figure 1:
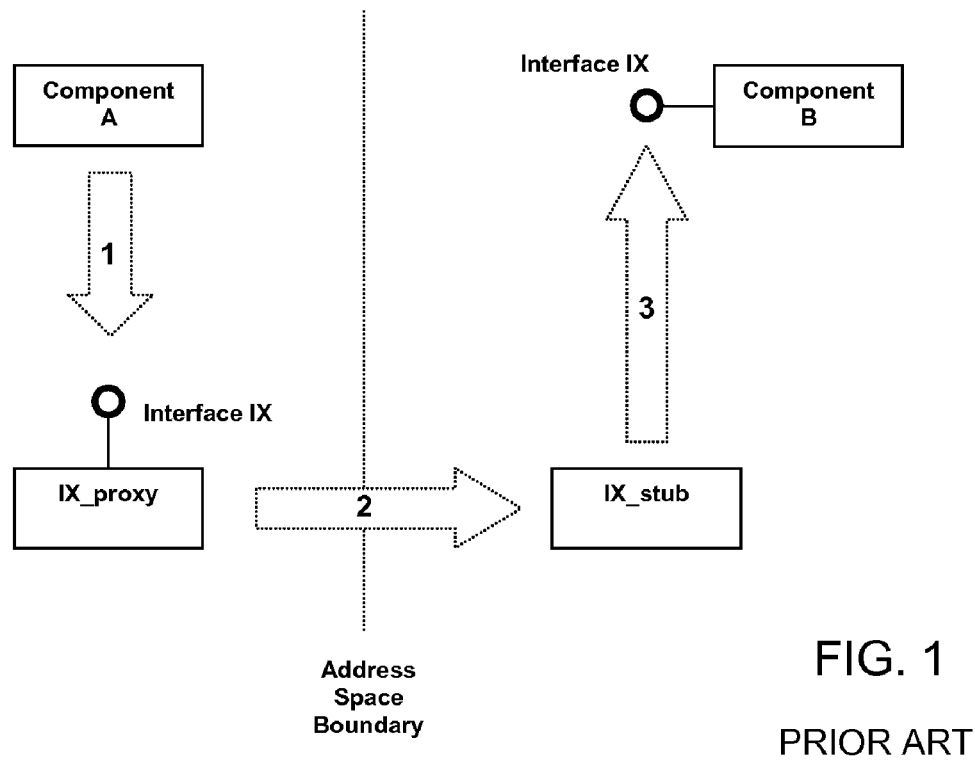
FIG. 1 depicts a generalized distributed processing system.
Figure 2:
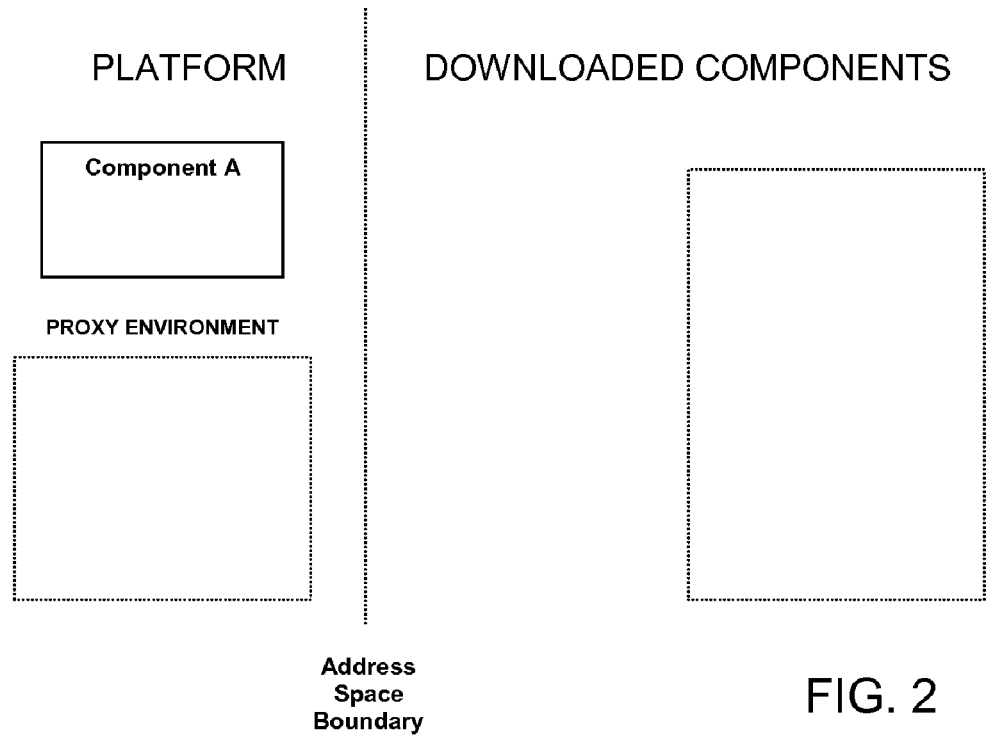
FIG. 2 depicts a distributed processing system that includes a proxy environment.

FIGS. 2-5 illustrate the operation of various aspects of this invention. As shown in FIG. 2, a Platform, which may be included in a mobile telephone or terminal in a wireless communication system, is configured such that it includes a Proxy Environment, which allows proxies to be injected into the Platform. The Platform is also configured to include a software component A, which may for example need to invoke one or more methods in one or more downloaded software components (e.g., callbacks). The downloaded components are included in an address space that can be considered as separated by a boundary from the address space that includes component A and the Proxy Environment. FIG. 2 depicts an initial state, in which the Proxy Environment is empty, and no software components have been downloaded.

Figure 3:
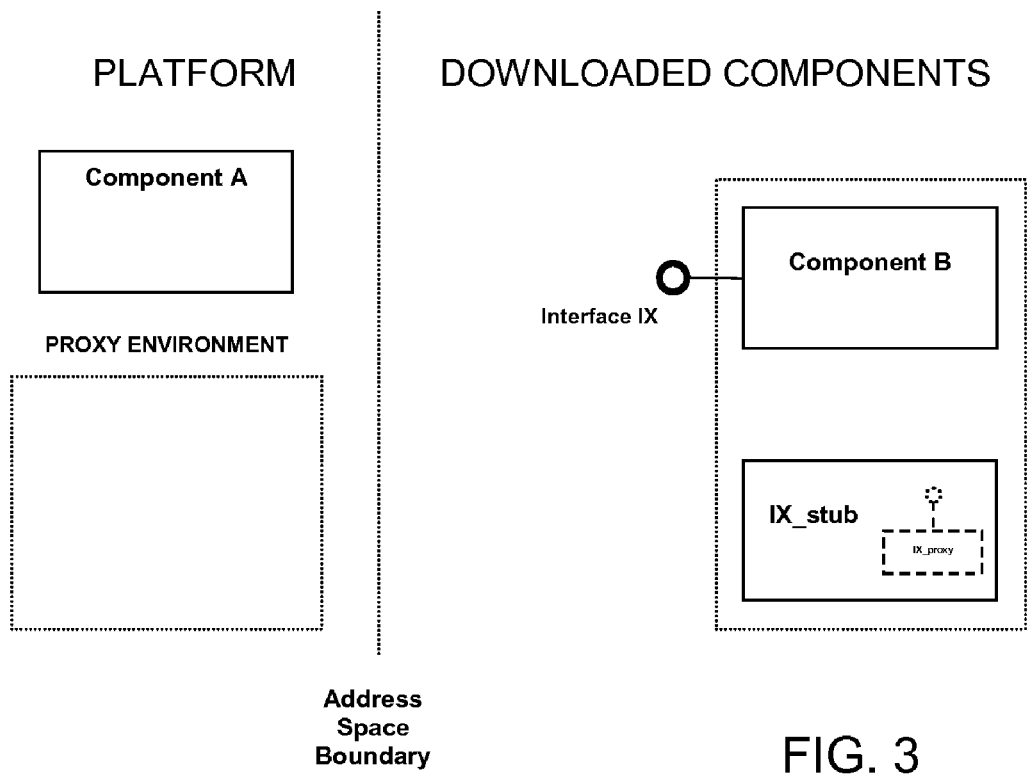
FIG. 3 depicts a software component that includes a stub having its own proxy.

FIG. 3 depicts a software component B that has been downloaded. The component B includes a stub IX_stub. The stub IX_stub contains its own proxy IX_proxy (indicated by the dashed lines) that allows the software component B to be used remotely, for example by components in the Platform.

Figure 4:
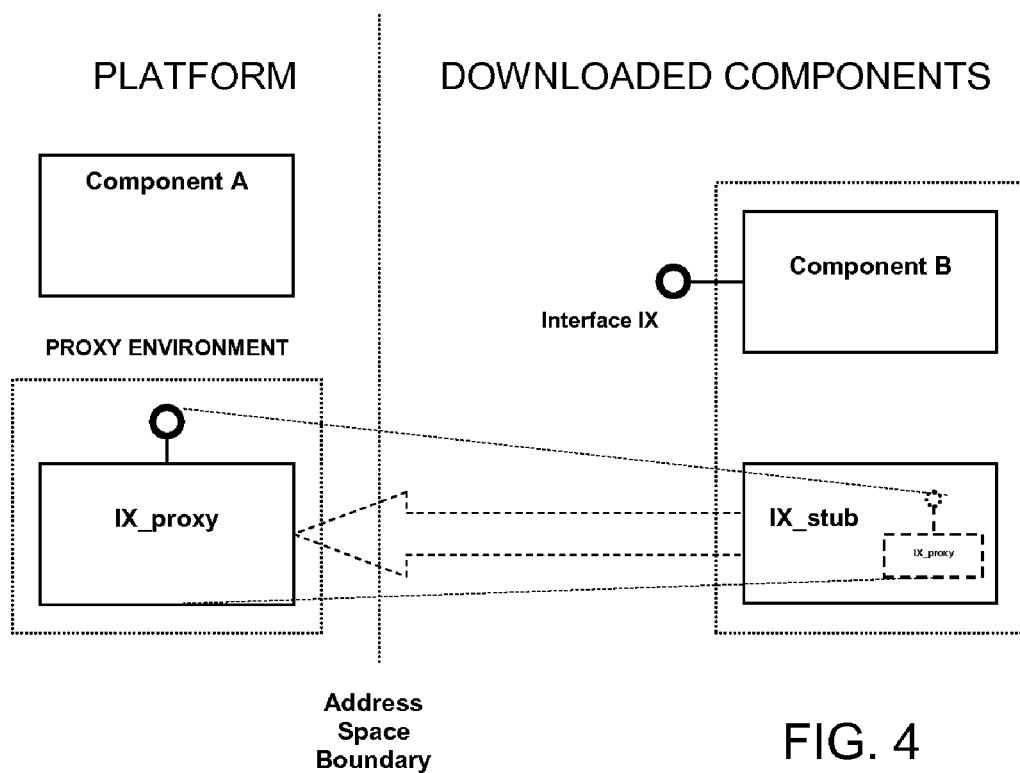
FIG. 4 depicts injection of a proxy into a Proxy Environment of a Platform.

In FIG. 4, the arrow in dashed lines depicts the proxy IX_proxy being injected into the Proxy Environment of the Platform, which is to say, the proxy is transferred from the stub to the remote target environment. The transfer can occur on installation of the component B, on the earliest invocation of a method in the application (component B), or "lazily", as described in more detail below.

Figure 5:
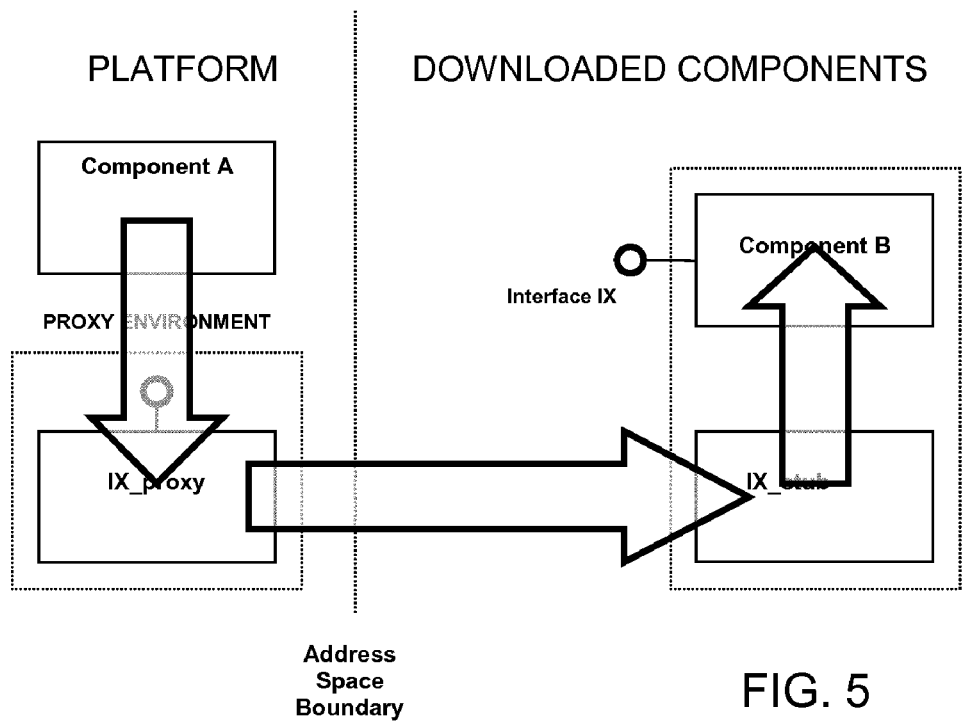
FIG. 5 depicts establishment of a connection between software components across an address space boundary.

The arrows in FIG. 5 depict establishment of a connection from the software component A to the software component B, enabling the component A to invoke methods in component B as if component B resided in A's environment, which is to say, on component A's side of the address space boundary.

Figure 6:
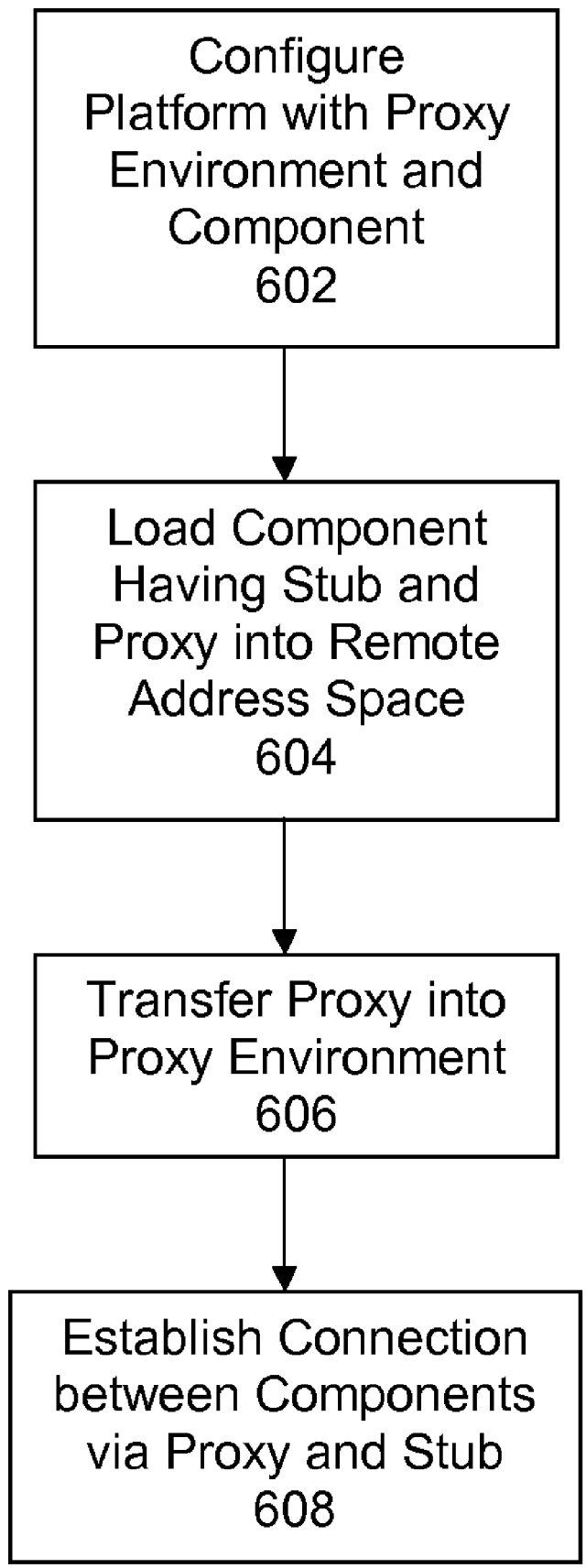
FIG. 6 is a flow chart of a method of operating software components in a processing system.

Thus, it can be appreciated that this invention can be embodied in a method of operating software components in a processing system, the steps of which are depicted by the flow chart of FIG. 6. In step 602, a Platform is configured to include a Proxy Environment and a first software component. The Proxy Environment enables proxies to be injected into the Platform, and the software component needs to invoke at least one method in at least one second software component. In step 604, the second software component is downloaded into a remote address space separate from a local address space that includes the first software component and the Proxy Environment. The second software component includes a stub for an interface and a proxy for the stub that enables the second software component to be used remotely by the first software component. In step 606, the proxy is transferred into the Proxy Environment, and in step 608, a connection between the first software component and the second software component is established via the proxy and stub. The connection enables the first software component to invoke at least one method in the second software component as if the second software component were local to the first software component.

Several phases of the lifecycles of applications are affected by operations according to FIGS. 2-5, including compiling IDL files during development, downloading and installing applications, and starting applications in target systems. These phases are described below in the context of downloadable Java applications, and although it is currently believed that this is a particularly attractive context for this invention, it will be understood that the invention is not limited to Java.

Compilation of IDL Files During Development

While developing an application, IDL files describing interfaces, such as ECM interfaces, are compiled to the application language. For a Java application, this means that a Java class is generated from an IDL interface. For a callback interface, this generated Java code preferably includes a "blueprint", which is code that holds sufficient information for forwarding method invocations (including marshalled parameters and return values) via a proxy and a stub to a receiving component.

Figure 7:
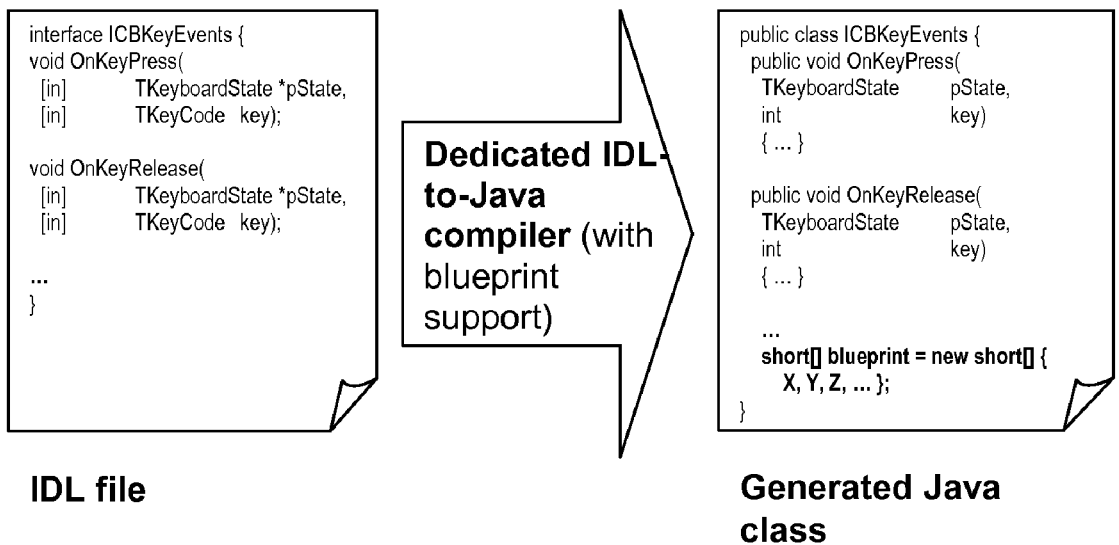
FIG. 7 depicts translation of an IDL file to a Java file.

FIG. 7 depicts translation of an exemplary IDL file for an interface ICBKeyEvents, concerning presses on the keypad of a device such as a mobile phone, to a Java file that includes a blueprint describing the signatures of native marshalling methods for that interface. The ICBKeyEvents interface has two methods, OnKeyPress and OnKeyRelease, and each of the methods takes two parameters, pState and key, with types TKeyboardState and TKeyCode, respectively. The meanings of the types TKeyboardState and TKeyCode are not shown in the IDL file, but would be defined elsewhere. The IDL file holds the information described here but in a formal (machine-readable) fashion.

The same IDLs as otherwise used for C applications can be used for the IDL-to-Java compiler; no specific details need be added to the IDL files. In concept, the compiler has a front-end that analyzes the IDL files, and any number of back-ends that generate code in any number of respective programming languages, e.g., C and Java, including documentation (e.g., documentation written in HTML for the IDL interfaces in OPA). For C, Java, and other languages, the same front-end is used to parse the IDL files, but different back-ends are used, and hence the compiler "knows" the details of the IDL, since it includes an IDL front-end.

It will be appreciated that writing a suitable compiler is well within the capability of a programmer having ordinary skill in this art. Moreover, IDL-to-Java compilers are widely available for several kinds of IDL, although it is currently believed that such compilers do not include blueprints as they are described in this application. It will also be appreciated that blueprint support is expected to be readily provided for programming languages in addition to Java. A purpose of a blueprint is to configure the native proxy environment, and thus a blueprint is substantially independent of the actual language used in the downloaded application.

Downloading and Installing an Application

A Java application is typically downloaded as a set of compiled Java files (i.e., class files). In the case of callback interfaces, it is currently believed that it is preferable to download the blueprint within the interface's class file.

Starting an Application in the Target System

During execution of a Java application, the application's classes are loaded into a virtual machine (VM), including interface classes generated by the IDL-to-Java compiler. When a class corresponding to a callback interface (such as ICBKeyEvents in the example depicted in FIG. 7) is loaded, the blueprint for that interface is injected (transferred) into the Platform's native part, i.e., the Proxy Environment depicted in FIGS. 2-5.

This description means that the blueprint is injected "lazily", which is to say, as it becomes needed during program execution or class loading. Nevertheless, the blueprint can be injected at any time between application installation and the first use of the blueprinted interface.

Once the blueprint has been injected, it is analyzed by the Proxy Environment, and a native proxy is created with one marshalling method for each interface method, with each marshalling method being responsible for marshalling the parameters and passing them on to the Java stub, and a virtual method table (vtable) that references the marshalling methods above. Hence, the vtable and the marshalling methods are generated or configured at run-time, rather than at compile-time.

A vtable is a run-time representation of an interface type, and is a table of references to method implementations, one for each method in the interface. Including the interface identity in a vtable can be useful in performing run-time type checking, e.g., in ECM. In COM and ECM, for example, two components implementing the same interface have vtables with the same layout (e.g., the same number of entries), but the table entries refer to different implementations (because each component contains its own implementation). If an interface identity is present in the vtable, two implementations of the same interface will share the same identity. In jOPA, the vtable entries refer to the generated/configured marshalling methods (based on blueprints).

A component using the interface invokes methods by looking up the corresponding entry in the vtable, and invokes the method the entry refers to. A component implementing the interface provides a vtable referencing the component's implementations of the interface methods. The effect of this scheme is dynamic binding, i.e., a component A that needs to invoke a method in interface IX of another component B does not need to know anything about component B until run-time except the fact that component B implements IX.

Among other advantages, embodiments of this invention can enjoy one or more of these advantages: lower consumption of code storage space (e.g., flash memory, read-only memory, or hard disk); a generic and small Proxy Environment that does not contain any details specific to particular interfaces but adapts to the interfaces at hand; if callback interface classes are installed as part of an application, storage is required only for blueprints for interfaces actually used by applications; if callback interface classes are installed permanently in a Platform, storage is still saved because blueprints require less storage than the corresponding vtable and marshalling methods; and ability to provide Java interfaces to Platform functionality after a target system has left production.

Figure 8:
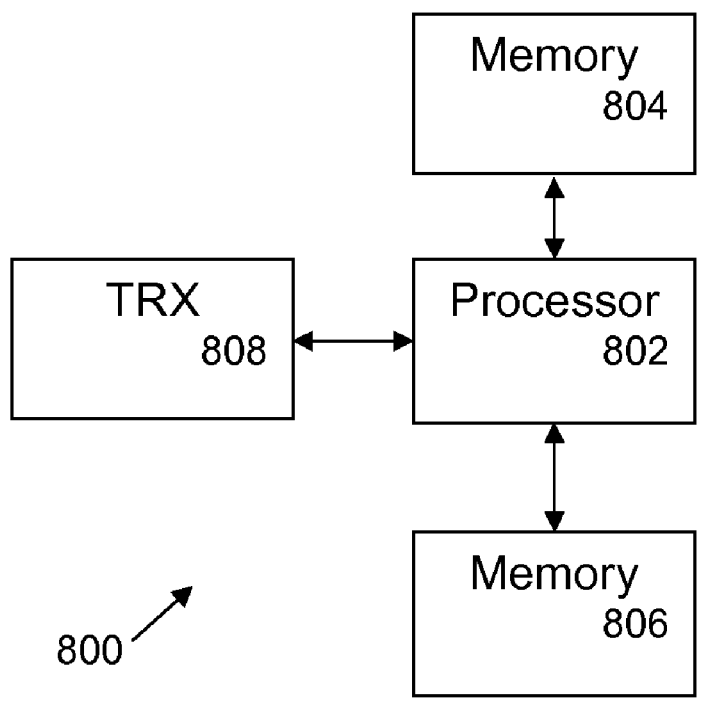
FIG. 8 depicts a user equipment in a communication system.

FIG. 8 depicts a user equipment (UE) 800 in a wireless communication system, such as a cellular mobile telephone network, that can implement the methods described above. The artisan will understand that the components and arrangement depicted in FIG. 8 are examples and should not be construed as limiting the components and arrangement of an actual communication system.

Among other things, the UE 800 includes one or more programmable processors 802 or suitable logic that processes information stored in one or more memories 804, 806. The stored information may include system information, e.g. radio access technology, of one or more cells and lists of available and neighboring networks, which the processor 802 can use in carrying out its program instructions. The stored information also includes one or more software components as described above, one or more of which can be downloaded into the UE and executed by the processors 802. It will be appreciated that the processor 802 typically includes timers, etc. that facilitate its operations. Transceiver (TRX) circuitry 808 provides for the reception and transmission of control and traffic signals on the link between the UE 800 and other parts of the network, and is controlled by the processor 802.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random access memory, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The embodiments described above are merely illustrative and should not be considered restrictive in any way. The scope of the invention is determined by the following claims, and all variations and equivalents that fall within the range of the claims are intended to be embraced therein.

What is claimed is:

1. A method of operating software components in a processing system, comprising the steps of:
configuring a Platform to include a Proxy Environment and a first software component, wherein the Proxy Environment enables proxies to be injected into the Platform, and the first software component needs to invoke at least one method in at least one second software component;
downloading the at least one second software component into a remote address space separate from a local address space that includes the first software component and the Proxy Environment, wherein the second software component includes a stub for an interface and a proxy for the stub that enables the second software component to be used remotely by the first software component;

wherein the second software component includes blueprint code that holds sufficient information for forwarding method invocations by the first software component via the proxy and stub to the second software component and the blueprint code describes marshalled parameters and return values;

analyzing the blueprint code by the Proxy Environment and creating a native proxy with one marshalling method for each interface method;

transferring the proxy into the Proxy Environment; and establishing a connection between the first software component and the second software component via the proxy and stub, wherein the connection enables the first software component to invoke at least one method in the second software component as if the second software component were local to the first software component.

2. The method of claim 1, wherein the proxy is transferred into the Proxy Environment at a time between installation and an earliest invocation of a method in the second software component.

3. The method of claim 2, wherein the proxy is transferred when the proxy is needed during program execution or class loading.

4. The method of claim 1, wherein the method is performed in a wireless communication device.

5. The method of claim 1, wherein the Platform is a native environment.

6. The method of claim 5, wherein the second software component is loaded into a Java environment.

7. The method of claim 1, wherein the blueprint code is included within the interface's class file.

8. The method of claim 7, wherein the blueprint code is transferred into the Proxy Environment when a class corresponding to the interface is loaded.

9. The method of claim 1, wherein each marshalling method is responsible for marshalling parameters and passing them on to the stub, and a virtual method table references the marshalling methods.

10. The method of claim 9, wherein the first software component invokes a method in a second software component by looking up a corresponding entry in the virtual method table and invoking the marshalling method referenced by the entry.

11. A program product comprising a software component executable by a processing system stored on a non-transitory computer-readable medium, the software component comprising:

a stub for an interface in the software component;

the stub includes at least a description of a proxy for the stub, wherein the proxy enables the software component to be used remotely by an other software component in the processing system when a connection is established between the software component in a remote address space and the other software component in a local address space via the proxy and stub that enables the connection enables the other software component to invoke at least one method in the software component as if the software component were local to the other software component;

the description includes blueprint code that holds sufficient information for forwarding method invocations by the other software component via the proxy and stub to the software component; and the blueprint code describes marshalled parameters and return values, wherein the blueprint code is analyzed by a Proxy Environment and a native proxy is created with one marshalling method for each interface method.

12. The program product of claim 11, wherein the blueprint code is included within the interface's class file.

13. The program product of claim 12, wherein the blueprint code is transferred into the Proxy Environment when a class corresponding to the interface is loaded.

14. The program product of claim 11, wherein each marshalling method is responsible for marshalling parameters and passing them on to the stub, and a virtual method table references the marshalling methods.

15. The program product of claim 14, wherein the first software component invokes a method in a second software component by looking up a corresponding entry in the virtual method table and invoking the marshalling method referenced by the entry.

16. A user equipment in a wireless communication system, comprising:

at least one memory;

at least one programmable processor that processes information stored in the at least one memory;

the stored information includes first and second software components;

the processor configures a Platform to include a Proxy Environment and the first software component;

the Proxy Environment enables proxies to be injected into the Platform;

the first software component is configured to invoke at least one method in the second software component;

the second software component is downloadable into a remote address space in the at least one memory that is separate from a local address space in the at least one memory that includes the first software component and the Proxy Environment, wherein the second software component includes a stub for an interface and a proxy for the stub that enables the second software component to be used remotely by the first software component;

the proxy is transferrable into the Proxy Environment;

the proxy and stub is configured to establish a connection between the first software component and the second software component, the connection enables the first software component to invoke at least one method in the second software component as if the second software component were local to the first software component;

the second software component includes blueprint code that holds sufficient information for forwarding method invocations by the first software component via the proxy and stub to the second software component;

the blueprint code describes marshalled parameters and return values; and the Proxy Environment is configured to analyze the blueprint code and create a native proxy with one marshalling method for each interface method.

17. The user equipment of claim 16, wherein the proxy is transferred into the Proxy Environment at a time between installation and an earliest invocation of a method in the second software component.

18. The user equipment of claim 17, wherein the proxy is transferred when the proxy is needed during program execution or class loading.

19. The user equipment of claim 16, wherein the Platform is a native environment.

20. The user equipment of claim 19, wherein the second software component is loaded into a Java environment.

21. The user equipment of claim 16, wherein the blueprint code is included within the interface's class file.

22. The user equipment of claim 21, wherein the blueprint code is transferred into the Proxy Environment when a class corresponding to the interface is loaded.

23. The user equipment of claim 16, wherein each marshalling method is responsible for marshalling parameters and passing them on to the stub, and a virtual method table references the marshalling methods.

24. The user equipment of claim 23, wherein the first software component invokes a method in a second software component by looking up a corresponding entry in the virtual method table and invoking the marshalling method referenced by the entry.

* * * * *